A. PARKER.
APPARATUS FOR CONTROLLING TIDE WATERS.
APPLICATION FILED AUG. 19, 1920.
1,389,212.
Patented Aug. 30, 1921.
2 SHEETS—SHEET 1.
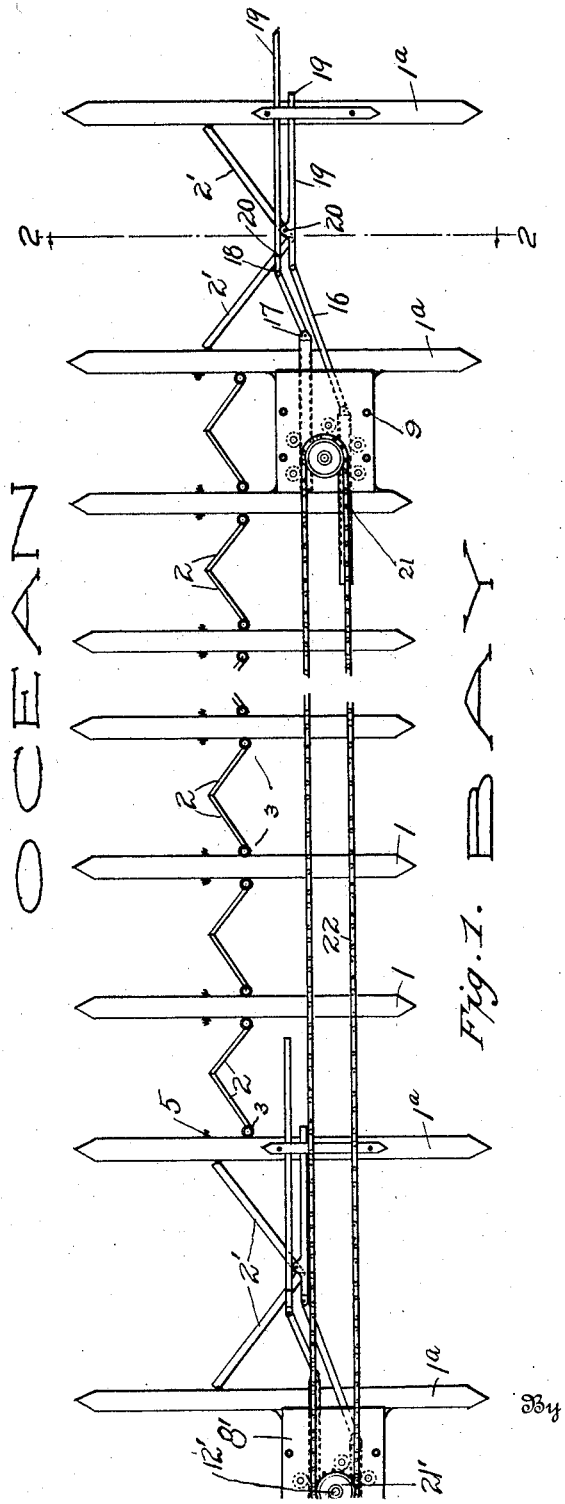
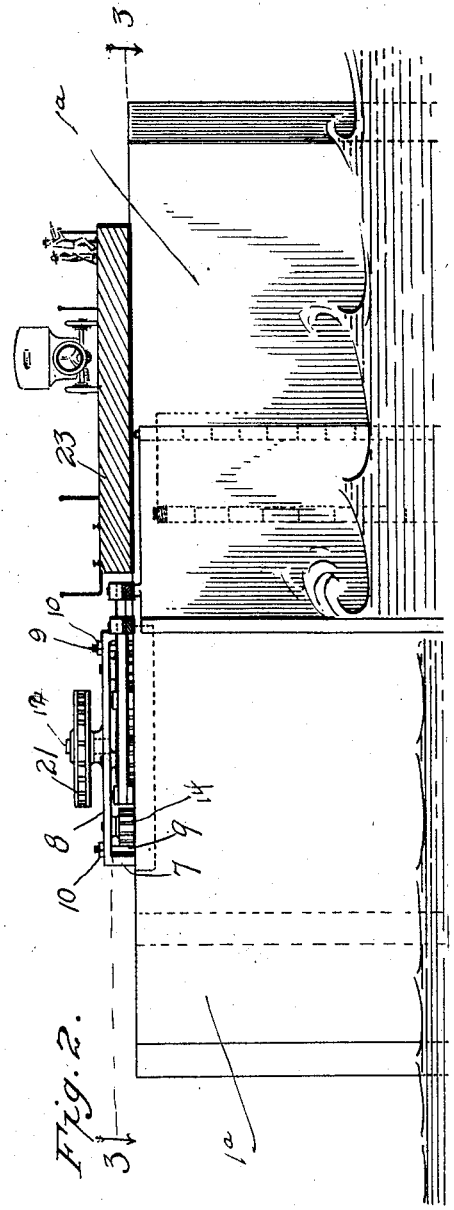
Inventor
ALEXANDER PARKER,
By Franklin H. Hough
Attorney

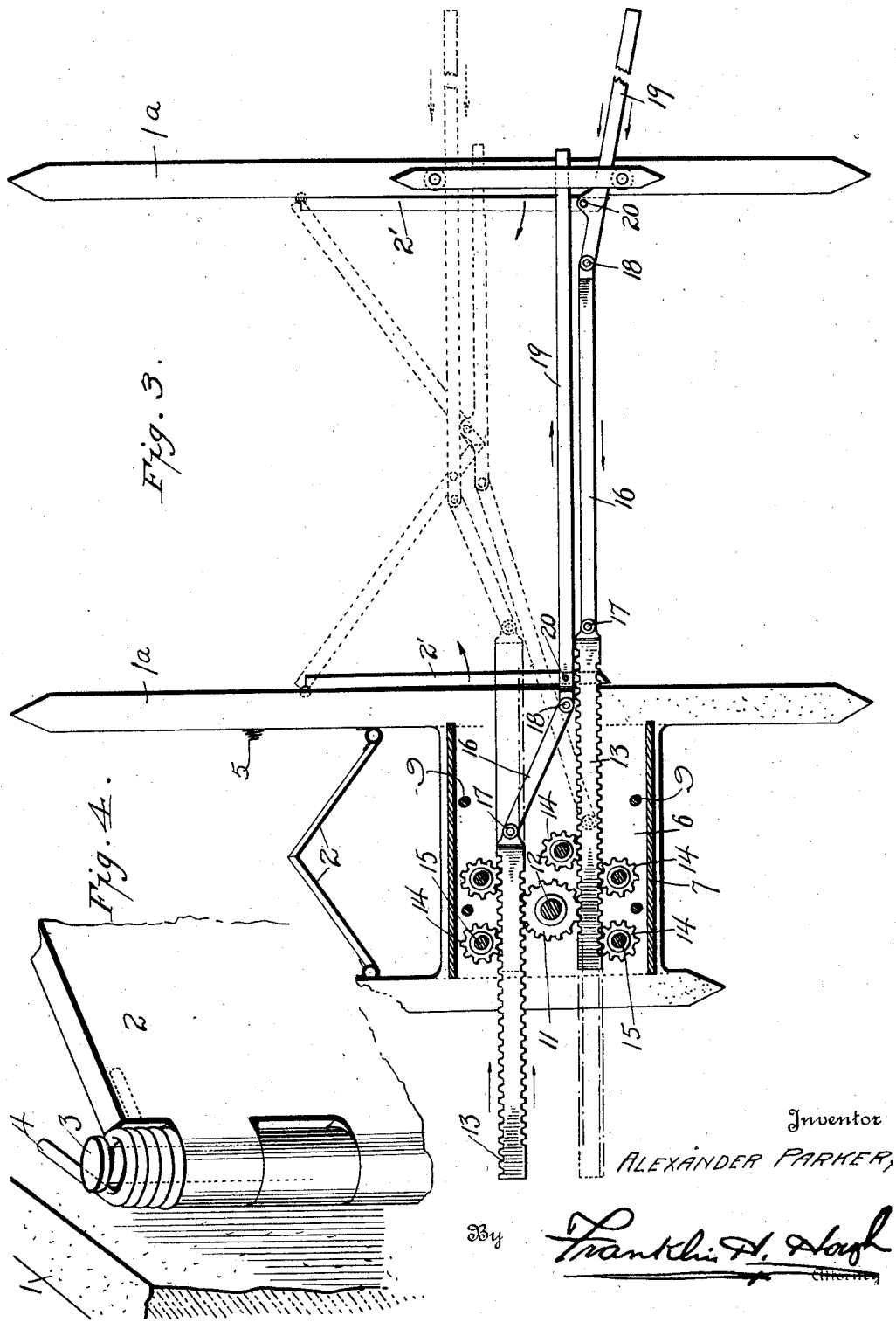

UNITED STATES PATENT OFFICE.

ALEXANDER PARKER, OF ETNA MILLS, CALIFORNIA.

APPARATUS FOR CONTROLLING TIDE-WATERS.

1,389,212. Specification of Letters Patent. Patented Aug. 30, 1921.

Application filed August 19, 1920. Serial No. 404,562.

*To all whom it may concern:*

Be it known that I, ALEXANDER PARKER, a citizen of the United States, residing at Etna Mills, in the county of Siskiyou and State of California, have invented certain new and useful Improvements in Apparatus for Controlling Tide-Waters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in apparatus for automatically controlling the flow of tides in bays, or rivers, as for instance San Francisco bay which has, as is well known, a narrow pass, or inlet, from the ocean; and the invention relates also to the combination with such apparatus of locks for permitting the incoming and outgoing of vessels, and to the provision of mechanically operated gates therefor.

The most important object in view is to prevent the tide water from coming into the bay, thereby making it possible to reclaim enormous areas of land now inundated at high tide by salt water. For instance, there are millions of acres of the richest land around San Francisco bay and up the Sacramento and San Joaquin rivers which are overflowed and now useless and which may be reclaimed by the installation of the apparatus of my invention.

The invention in its preferred form is clearly disclosed in the accompanying drawings which form part of this application, and in which:

Figure 1 is a view in top plan of the apparatus constituting my invention;

Fig. 2 is a sectional view on the line 2, 2 of Fig. 1, looking in the direction of the arrows;

Fig. 3 is a horizontal sectional view on the line 3, 3 of Fig. 2, looking in the direction of the arrows, and Fig. 4 is a fragmentary view in perspective of one of the piers and a gate hinged thereto and showing more particularly the spring means associated with the gate, tending to hold the gate in closed position.

Referring now in detail to the drawings: 1 designate a series of spaced parallel piers preferably of concrete, securely embedded in the bottom of a bay, communicating with an ocean; and 1ª designate two spaced parallel walls, two of said walls being placed at each end of a series of piers 1 and constituting the side walls of locks for the passage therethrough of incoming and outgoing vessels. These walls 1ª are also preferably of concrete.

Between each two adjacent piers 1 and between the end piers 1 and the adjacent lock wall 1ª are disposed automatically actuated gates 2, a pair of such gates being disposed between each two of said piers and between the end pier and the adjacent wall 1ª. These gates may be of any suitable construction and are hinged at one of their sides to a hinge pin 3, suitably supported from an adjacent pier 1, or the lock wall 1ª, as the case may be. A wire spring 4 is coiled around the hinge pin, preferably at the top thereof, and one terminal thereof bears against the adjacent pier 1, or the lock wall 1ª, and the other terminal against one face of the gate 2, tending to hold said gate in closed position, as shown in Figs. 1 and 4. Each of said gates 2 is preferably of a length somewhat greater than one-half the distance between each two adjacent piers, so that, when the gates are closed, they are in inclined engagement with each other, as clearly shown in Fig. 1. The gate hinge is of such construction that when the gates swing from their open to their closed position, they engage against each other and movement thereof is arrested as shown in the full line position shown in Fig. 1. However, any means for arresting the gates at the proper point in the opening movement thereof may be provided.

Coiled buffer springs 5 are carried by the piers 1 and the walls 1ª so that said gates contact therewith when swung from the closed to the open position thereof. Both the springs 4 and the springs 5 also tend to hold the gates with their free ends slightly spaced from the piers 1 and from the walls 1ª so that the incoming tide will have ready access between said gates and said piers to close the gates.

In operation, when the tide is at its lowest point and starts to flow into the bay, the gates 2 are automatically closed by the springs 4 and the action of the tide therein and the sea water will be prevented from entering the bay. When the tide has receded to slightly below the level of the bay water and continues to recede, the gates are automatically opened and the bay water will flow out.

Between each two lock walls 1ª, 1ª, are disposed lock gates 2' which are similar to the gates 2, but open in the reverse direction. Said gates 2' are hinged to the lock walls 1ª, as shown, and, like the gates 2, are in inclined engagement with each other when in closed position.

The invention contemplates mechanical means for closing said gates. The drawing shows my preferred form of such means, which I will now describe.

Between each end pier 1 and the adjacent lock wall 1ª, at the top thereof, is disposed a horizontal bed 6, preferably of reinforced concrete, and resting upon said bed is the depending marginal flange 7 of a casing 8, adapted to house certain parts of the lock gate operating mechanism. Said casing may be secured in position in any suitable manner, as by means of bolts 9 sunk in said concrete bed 6 and projecting through the top of said casing 8, nuts 10 being screwed on the threaded ends of said bolts and against the top of said casing 8. Disposed interiorly of said casing 8 is a rotatable pinion 11 on a shaft 12, projecting through said casing 8 and projecting at its lower end into said concrete bed 6. Said pinion 11 meshes at diametrically opposite points with rack bars 13, 13. Idler pinions 14 are disposed inside the casing 8 and are mounted on shafts 15, said pinions being provided to guide the racks 13 in their movement and to prevent the same from becoming disengaged from the pinion 11. For this purpose a pair of said pinions may be disposed so as to engage with the corresponding rack at the side thereof opposite that engaged by the pinion 11. Associated with each rack 13 is a link 16 which is pivoted at one end thereof, as shown at 17, to one end of the corresponding rack, and the other end of said link being pivoted as shown at 18, to one end of a manual operating lever 19. Pivoted to each lever 19, toward the pivotal end thereof, as shown at 20, is the otherwise free end of one of the lock gates 2'.

In operation it will be seen that as force is applied to one of the manual operating levers 19, when the gates are in the open position thereof, as shown in Fig. 3, the corresponding rack bar 13, connected by means of the link 16 to said operating bar, will be rectilinearly reciprocated, thereby rotating the pinion 11 and moving the other rack bar 13 in the reverse direction to the movement of the first rack bar. In other words, the two rack bars 13, 13 are reciprocated by means of the pinion 11 in opposite directions; consequently, the gates 2', 2', connected with each lever 19, are moved toward each other, so that they are moved from the full line position thereof, or the open position shown in Fig. 3, to the dotted line position, or closed position, shown in the same figure.

The shaft 12 of the pinion 11 is extended above the casing 8 and carries a sprocket wheel 21, engaged by a sprocket chain 22, passing around a second sprocket wheel 21', carried on the exteriorly projecting end of a similar shaft 12', carrying a pinion similar to the pinion 11 and meshing with similar racks inside a similar casing 8'. It will be understood that the gate closing mechanism, of the gates 2', 2', adjacent the casing 8', is exactly the same as described in connection with the lock gates 2', 2' at the opposite end.

It will, therefore, be seen that the gates 2', 2' of the two locks are operated simultaneously.

My invention also contemplates the provision of a suitable bridge 23 extending transversely across the tops of the piers 1, as shown in Fig. 2 in section, said bridge being conveniently used in crossing the channel.

What I claim to be new is:

1. An apparatus for controlling tides at the entrances of bays which communicate with salt water, comprising a series of spaced parallel piers, gates hinged to said piers at corresponding points thereon, a pair of said gates being disposed between each two piers, each gate being of a length somewhat greater than one-half the distance between the piers between which said pair of gates is disposed, whereby, when said pair of gates is closed, said gates will be inclined to each other, said gates opening out from the bay and automatically closable by the incoming tide.

2. An apparatus for controlling tides at the entrances of bays which communicate with salt water, comprising a series of spaced parallel piers, gates hinged to said piers at corresponding points thereon, a pair of said gates being disposed between each two piers, each gate being of a length somewhat greater than one-half the distance between the piers between which said pair of gates is disposed, whereby, when said pair of gates is closed, said gates will be inclined to each other, said gates opening out from the bay and automatically closable by the incoming tide, and springs coiled around the hinge pin of each gate and bearing against the adjacent pier and against said gate and tending to move said gate to a closed position and to hold the same in such closed position.

3. An apparatus for controlling tides at the entrances of bays which communicate with salt water, comprising a series of spaced parallel piers, gates hinged to said piers at corresponding points thereon, a pair of said gates being disposed between each two piers, each gate being of a length somewhat greater than one-half the distance between the piers between which said pair of gates is disposed, whereby, when said pair of gates is closed, said gates will be inclined to each other, said gates opening out from the bay and automatically closable by the incoming tide, and locks at the ends of said series of piers, each of said locks comprising side walls and a pair of gates disposed between said side walls and means for simultaneously closing said lock gates.

4. An apparatus for controlling tides at the entrances of bays which communicate with salt water, comprising a series of spaced parallel piers, gates hinged to said piers at corresponding points thereon, a pair of said gates being disposed between each two piers, each gate being of a length somewhat greater than one-half the distance between the piers between which said pair of gates is disposed, whereby, when said pair of gates is closed, said gates will be inclined to each other, said gates opening out from the bay and automatically closable by the incoming tide, and springs carried by said piers and projecting therefrom and yieldingly bearing against said pier gates when the latter are in open position.

In testimony whereof I hereunto affix my signature.

ALEXANDER PARKER.